United States Patent [19]
Osder

[11] Patent Number: 5,799,901
[45] Date of Patent: Sep. 1, 1998

[54] ROTOR BLADE SWASHPLATE-AXIS ROTATION AND GYROSCOPIC MOMENTS COMPENSATOR

[75] Inventor: Stephen S. Osder, Scottsdale, Ariz.

[73] Assignee: McDonnell Douglas Helicopter Co., Mesa, Ariz.

[21] Appl. No.: 840,369

[22] Filed: Apr. 29, 1997

Related U.S. Application Data

[62] Division of Ser. No. 567,953, Dec. 6, 1995.

[51] Int. Cl.⁶ .......................... B64C 11/34; B64C 11/44; B64C 27/54; B63H 3/10
[52] U.S. Cl. ...................... 244/17.13; 244/182; 416/104; 416/114; 701/4
[58] Field of Search ............... 244/17.13, 17.11, 244/180, 182, 195; 416/31, 103, 104, 105, 114; 701/4, 5

[56] References Cited

U.S. PATENT DOCUMENTS

| | | | |
|---|---|---|---|
| 3,603,697 | 9/1971 | Lane | 416/33 |
| 4,355,358 | 10/1982 | Clelford et al. | 244/17.13 |
| 4,519,743 | 5/1985 | Ham | 416/31 |
| 4,675,827 | 6/1987 | Narita et al. | 364/478 |
| 4,807,129 | 2/1989 | Perks | 244/17.13 |
| 4,834,318 | 5/1989 | Taylor et al. | 244/17.13 |
| 4,947,334 | 8/1990 | Massey et al. | 244/17.13 |
| 4,958,786 | 9/1990 | Ogawa et al. | 244/17.13 |
| 4,965,879 | 10/1990 | Fischer, Jr. | 244/17.11 |
| 5,001,646 | 3/1991 | Caldwell et al. | |
| 5,199,849 | 4/1993 | Leman | 416/114 |
| 5,214,596 | 5/1993 | Muller | 244/17.13 |
| 5,224,664 | 7/1993 | Adams, Sr. et al. | 244/17.11 |
| 5,265,826 | 11/1993 | Ebert et al. | 244/17.13 |
| 5,265,827 | 11/1993 | Gerhardt | 244/20 |
| 5,274,558 | 12/1993 | High et al. | 244/180 |
| 5,314,147 | 5/1994 | Ebert et al. | 244/182 |

*Primary Examiner*—V. Lissi Mojica
*Attorney, Agent, or Firm*—Donald E. Stout

[57] ABSTRACT

An apparatus for compensating for spatial phase angle phase errors in the flapping angle oscillations of a rotor blade is disclosed. The apparatus receives a measured aircraft roll and a measured aircraft pitch. Gyroscopic moments resulting from these measured rolls and pitches are determined, and compensating gyroscopic moments are then generated and summed with commanded pitch and roll accelerations. Flapping angle phase lags of the rotor blade swashplate are added to the summed signals to cancel any flapping angle phase leads, caused by changes in aircraft or rotor blade speed caused by installation configurations of the rotor blade swashplate.

14 Claims, 6 Drawing Sheets

ROTOR BLADE SWASHPLATE-AXIS ROTATION AND GYROSCOPIC MOMENTS COMPENSATOR

This is a division of application Ser. No. 08/567,953 filed Dec. 6, 1995.

BACKGROUND OF THE INVENTION

The present invention relates generally to aircraft capable of combined rotary wing and fixed-wing flight and, more particularly, to mechanisms for controlling and compensating a rotor blade swashplate.

The prior art has long sought to simply and efficiently control helicopters to prevent pitch control commands from producing rolling and yawing moments, for example, and vice versa. A flight control system that can relate control moments in a single aircraft axis with a specific control stick or control actuator position is called a "decoupled control system." One decoupling technique for helicopters is disclosed in the U.S. Pat. No. 5,001,646, titled "Automated Helicopter Flight Control System," of which applicant is an inventor. This prior art decoupling technique used a force-moment decoupling matrix inserted into the path of pitch, roll, and yaw angular acceleration commands plus vertical acceleration commands to obtain decoupled control. The force-moment decoupling matrix resulted in cyclic, collective, and tail rotor blade outputs. Combinations of these outputs were used to produce moments and forces along any particular, desired axis. This prior art decoupling process was aided by high gain control loops for stabilizing the aircraft to the reference attitude and velocities.

This prior art decoupling technique, although effective for many fly-by-wire flight control applications, relied on defining entities such as the conventional cyclic and collective outputs. In applications such as combined helicopter and fixed wing flight, where the rotor blade speeds may be continuously varied and where the interactions between rotor blade controls and fixed wing aerodynamic surface controls are intimately related, the flight control moments produced by manipulating the rotor's tip path plane must be precisely controlled in terms of the spatial phase of the rotor blade flapping motions. (Spatial phase is defined as the azimuth angle between the rotor blade, when its sinusoidal oscillatory flapping excursion is maximum, and a reference axis aligned with the aircraft—such as the fore-aft axis.) In normal helicopter controls, longitudinal and lateral cyclic controls cause a rotor blade swashplate mechanism to tilt through prescribed angles which are related to the geometry of the rotor blade swashplate orientation. Those geometrical relationships result in oscillatory rotor blade flapping which is used to produce controlling moments on the aircraft. Ideally, a longitudinal cyclic command would produce a spatial phase of the flapping oscillations such that the rotor blade tip path plane tilts in a manner that produces a "pure" pitching moment on the aircraft—meaning that there is no concurrent rolling moment. In reality, the complex rotor blade dynamic effects, which contribute to the spatial phase of the flapping oscillations, do not permit a fixed geometric relationship between cyclic control inputs and the ideal rotor blade swashplate angle tilt that can produce decoupled control. Aircraft motions, aircraft speed, rotor blade speed, average rotor blade pitch (collective), and rotor blade hinge characteristics contribute to the variability of the flapping oscillation phase, thereby contributing to the undesirable coupling of rolling moments into a pitching moment command, and vice versa.

In the above-cited U.S. Pat. No. 5,001,646, the force-moment decoupling matrix made use of predicted aerodynamic characteristics to compute the combination of cyclic, collective, and tail rotor/yaw moment controls needed to produce a control moment in any single axis. This technique, however, cannot account for such phenomena as variable rotor blade speed and gyroscopic moments on the tip path plane of the rotor blade when the aircraft is subject to pitch, roll, and yaw angular velocities. These phenomena are especially important in the combined rotary wing and fixed wing flight, which occurs in the transition phase of flight of the jet-powered tri-mode aircraft. In this transition phase, as speed increases from helicopter-mode speeds to the conversion speed at which the rotor blade is stopped and locked, total lift of the aircraft must be transferred smoothly from the rotor blade to the canard and tail surfaces of the aircraft. Likewise, as speed is decreased from conversion speed when the rotor blade is re-started, lift is transferred smoothly from the non-rotating aero lifting surfaces to the rotor blade. In the flight regimes of the transition phase where the rotor blade lift is low, the flapping angle must be held to a minimum. This must be done by lowering the attitude stabilization control gains, which are present in the rotor blade part of a combined rotor blade and aerodynamic surface attitude-control-and-stabilization system. This precise control of the rotor blade flapping requires precise management of the spatial phase of the rotor blade flapping oscillation, including the adjustment of the flapping amplitude and phase to compensate for gyroscopic moments caused by aircraft angular rotations. Prior art has not provided for this direct control of the flapping oscillation phase, including the compensation for the above mentioned gyroscopic moments. While that precise flapping oscillation phase control is essential for successful operation of the jet powered-tri mode aircraft in its transition flight regime, it can also provide a valuable method of achieving decoupled flight control in a fly-by-wire system mechanization for a conventional helicopter.

SUMMARY OF THE INVENTION

The present invention provides decoupled control to fly-by-wire aircraft without defining explicit cyclic and collective control outputs. Control commands for the three rotational axes of the aircraft are in the form of pitch, roll, and yaw angular acceleration requirements. Integrated with these rotational controls is a vertical lift control in the form of a vertical acceleration requirement. Part of these acceleration requirements is achieved via aerodynamic surface controls for a jet powered tri-mode aircraft, which combines rotary wing and fixed wing flight, but the present invention relates primarily to the part of the flight control mechanization which involves the generation of aircraft forces and moments via control of the rotor blade tip path plane pitch. While the invention is described in the context of the jet-powered tri-mode aircraft application, it is completely applicable to any conventional helicopter that is equipped with fly-by-wire controls.

A pitch angular acceleration command and a roll angular acceleration command, along with lift acceleration requirements, computed by a fly-by-wire computer are translated into a set of corresponding rotor blade flapping oscillations, which is required to meet these commands. The rotor blade flapping oscillations are defined by a spatial phase angle and a rotor blade flapping angle. The rotor blade flapping angle varies as the spatial phase (azimuthal) angle changes in values between zero and 360 degrees. The required spatial phase angle of the rotor blade flapping oscillations is related to a tilt angle requirement for the stationary rotor blade swashplate which positions the moving rotor blade swashplate and its coupled pitch links. The computed flight control output is in the form of three actuator position commands, referred to as $Z_A$, $Z_B$, and $Z_C$. These three positions define a rotor blade swashplate tilt in one plane referred to as the φ plane, and in another orthogonal plane referred to as the θ plane. These positions also define an average linear displacement of the rotor blade swashplate, referred to as $Z_0$, which is proportional to the average collective pitch of the rotor blade. The rotor blade swashplate tilt angles φ and θ are related to the spatial phase angle of the rotor blade flapping oscillation. The rotor blade swashplate tilt angles φ and θ are used to define any specific required spatial phase angle of the rotor blade flapping oscillations. These two rotor blade swashplate tilt angles φ and θ (which are used to define the required spatial phase angle) will vary, depending on installation alignment, rotor blade speed, aircraft speed, and unique hinge characteristics. The required spatial phase angle, additionally, is affected by gyroscopic moments caused by the aircraft pitch rates and aircraft roll rates. The required spatial phase angle must therefore be rotated (by changing the two rotor blade swashplate tilt angles φ and θ) to compensate for these gyroscopic moments acting on the rotor blades as a result of the aircraft pitch rates and aircraft roll rates. The apparatus for computing the required spatial phase angle thus involves measurement of both the aircraft pitch rate and the aircraft roll rate to determine the changes needed in the φ and θ tilt planes of the rotor blade swashplate in order to generate a moment on the rotor blade tip path plane to compensate for the gyroscopic moments. Since the required spatial phase angle is dependent upon the rotor blade speed, the apparatus also includes measurement of the rotor blade speed and its inclusion into the spatial phase compensation algorithms, to thereby account for rotation of the spatial phase angle of the flapping as the rotor blade speed changes. The apparatus for implementing the required spatial phase angle compensations further includes calibrations for any physical installation tolerances in the rotor blade swashplate and actuator interfaces.

The present invention, together with additional features and advantages thereof, may best be understood by reference to the following description taken in connection with the accompanying illustrative drawings.

DESCRIPTION OF THE PREFERRED EMBODIMENT

A. General Overview of Jet Powered Tri-Mode Aircraft

Figure 1:
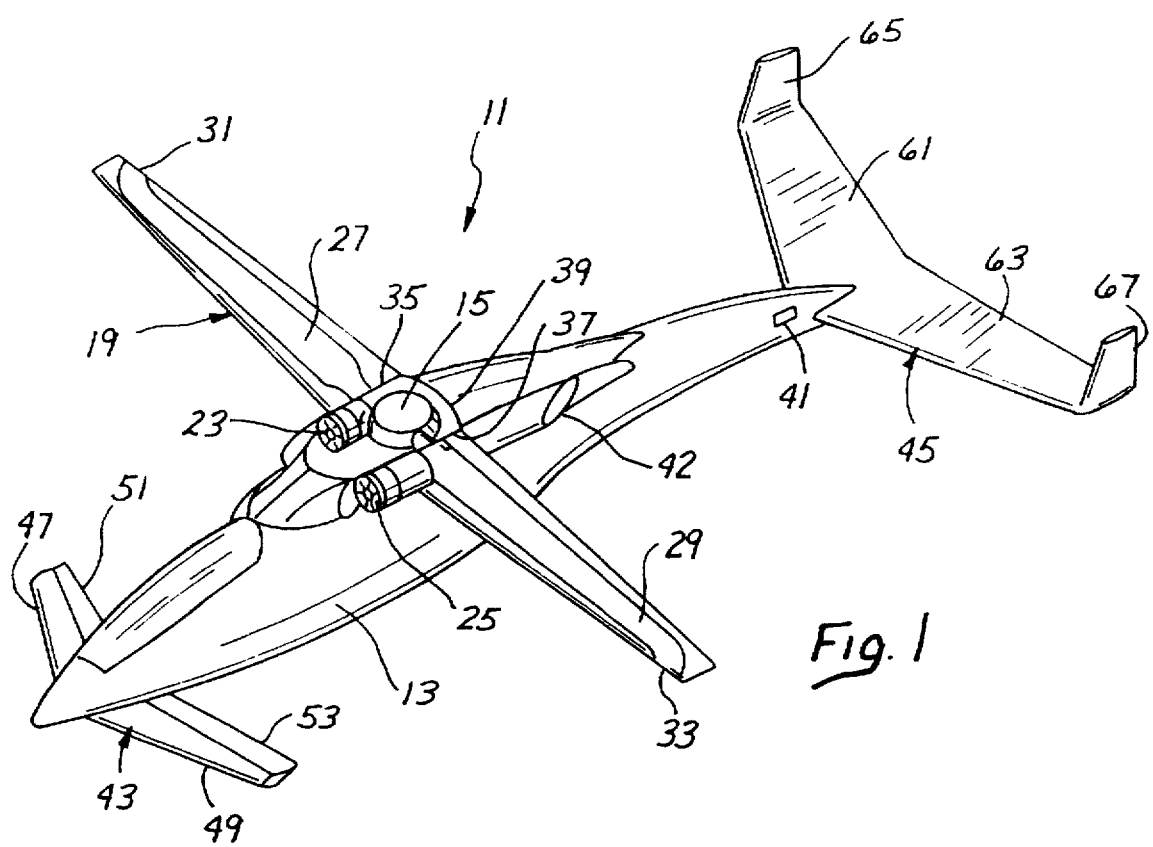
FIG. 1 is a perspective view of the jet-powered tri-mode aircraft according to the present invention.

A macro-perspective of the external structure of the jet powered tri-mode aircraft 11 of the presently preferred embodiment is shown in FIG. 1. The jet powered tri-mode aircraft 11 includes a fuselage 13 having one or a pair of low bypass turbo fan engines 23 and 25 mounted thereon. The rotor blade 19 contains flow ducts 27 and 29. Each of the two flow ducts 27, 29 serve to transport exhaust gases from the engines 23, 25 to exit nozzles 31, 33 located in the tips of the rotor blade 19. Exhaust gases from the two flow ducts 27, 29 spin the rotor blade 19 about the rotor blade hub 15. The rotor blade 19 preferably comprises symmetrical leading and trailing edges. In the helicopter mode, the front edge of the right side of the rotor blade 19 leads, and the rear edge of the left side of the rotor blade 19 leads. Thus, the symmetrical leading and trailing edges of the rotor blade 19 provides for effective operations irrespective of air flow direction.

The hub 15 preferably comprises a gimbaled/teetering type hub in order to provide flapping degrees of freedom. The two feathering hinges 35 and 37 permit changes in pitch of the left and right halves of rotor blade 19. As the right half of the rotor blade 19 moves through 360 degrees of azimuthal angle, for example, the pitch of that rotor blade 19 is changed to provide optimal lift and control. The aerodynamic hub fairing 39 houses cyclic and collective pitch controllers therein. A left thrustor 41 provides yaw control, as does a right thrustor (not shown) located on the right rear portion of the fuselage 13.

When the jet powered tri-mode aircraft is operated in the helicopter mode, the rotor blade speed can be regulated by a throttle control that modulates fuel flow to vary the torque applied to the rotor blade. This throttle control may be implemented using an electronic control loop that uses fuel control to change engine power in response to rotor blade speed errors.

The jet powered tri-mode aircraft operates in this helicopter mode until a predetermined aircraft travelling velocity V is reached. In the presently preferred embodiment, the jet powered tri-mode aircraft 11 enters the transitional mode of flight at approximately 60 knots. In the transitional mode, a portion of jet exhaust from the bypass turbo fan engines 23, 25 is rerouted to exit from the jet nozzles 42. As the aircraft travelling velocity V increases, more and more of the jet exhaust is routed to the jet nozzles 42, and less and less jet exhaust is routed to the exit nozzles 31, 33.

The high lift flaps 51, 53 of the left and right canard wings 47, 49 are deployed to obtain maximum lift during low-speed flight, as the aircraft travelling velocity increases above 60 knots. The canard wing 43, which is articulated, is rotated to increase its angle of attack. The canard wing thus gains lift with velocity, as does the horizontal tail 45. The horizontal tail 45 is also articulated. It is conventional with respect to other fixed-wing aircraft, and includes two elevons 61, 63 and two generally vertical portions 65, 67.

At an aircraft travelling velocity of approximately 125 to 130 knots, no jet exhaust is routed through the exit nozzles 31, 33, and all of the jet exhaust is routed out of the jet nozzles 42. Additionally, the rotor blade 19 does not generate any lift, and the entire lift of the jet powered tri-mode aircraft is generated by the canard wing 43 and horizontal tail 45.

As the jet powered tri-mode aircraft 11 approaches the conversion speed of 125 knots, the gimbal degree of freedom of the hub 15 is reduced through variable dampers, and the rotor blade 19 is completely unloaded with the ducts 27, 29 being set off. The gimbaling freedom is then locked, the rotor blade 19 stopped and locked to the fuselage 13, and the feathering hinges 35 and 37 locked out such that the rotor blade 17 is fixed to the fuselage 13. At aircraft travelling velocities above 125 knots, the jet powered tri-mode aircraft operates as a fixed-wing aircraft using conventional airplane controls. Cruise lift is shared between the fixed rotor blade 19, the canard 43, and the horizontal tail 45 to minimize induced drag. Further details of the general structure shown in FIG. 1 are disclosed in applicant's copending application Ser. No. 08/068,907 filed on May 28, 1993 and titled "Canard Rotor/Wing."

In the transitional mode of flight, power from the low bypass turbo fan engines 23, 25 provides propulsive thrust through the jet nozzles 42, while also powering the rotor blade 19 to generate necessary lift. Unlike conventional helicopters, fuel flow to the low bypass turbo fan engines 23, 25 can no longer be simply regulated to vary the torque applied to the rotor blade 19. As soon as part of the jet exhaust flow from the low bypass turbo fan engines 23, 25 is routed to the jet nozzles 42 for propulsive thrust, throttle control can no longer be used to maintain rotor blade speed without causing severe velocity and flight path disturbances.

Since rotor blade speed in the transitional mode can no longer be maintained by modulating fuel to the low bypass turbo fan engines 23, 25, the present invention uses a unique synergistic system of regulating the rotor blade speed by modulating the collective pitch of the rotor blade 19, combined with a flight path feedback control acting through the aerodynamic surfaces (elevons 61, 63, and the moving horizontal tail 45). Thus, any errors in the rotor blade speed are corrected by changing the collective pitch of the rotor blade 19, combined with corresponding aero surface commands used to hold the reference flight path. In the presently preferred embodiment, collective pitch of the rotor blade 19 is controlled by changing a collective position of the rotor blade swashplate.

B. Flight Control System Description

Figure 2A:
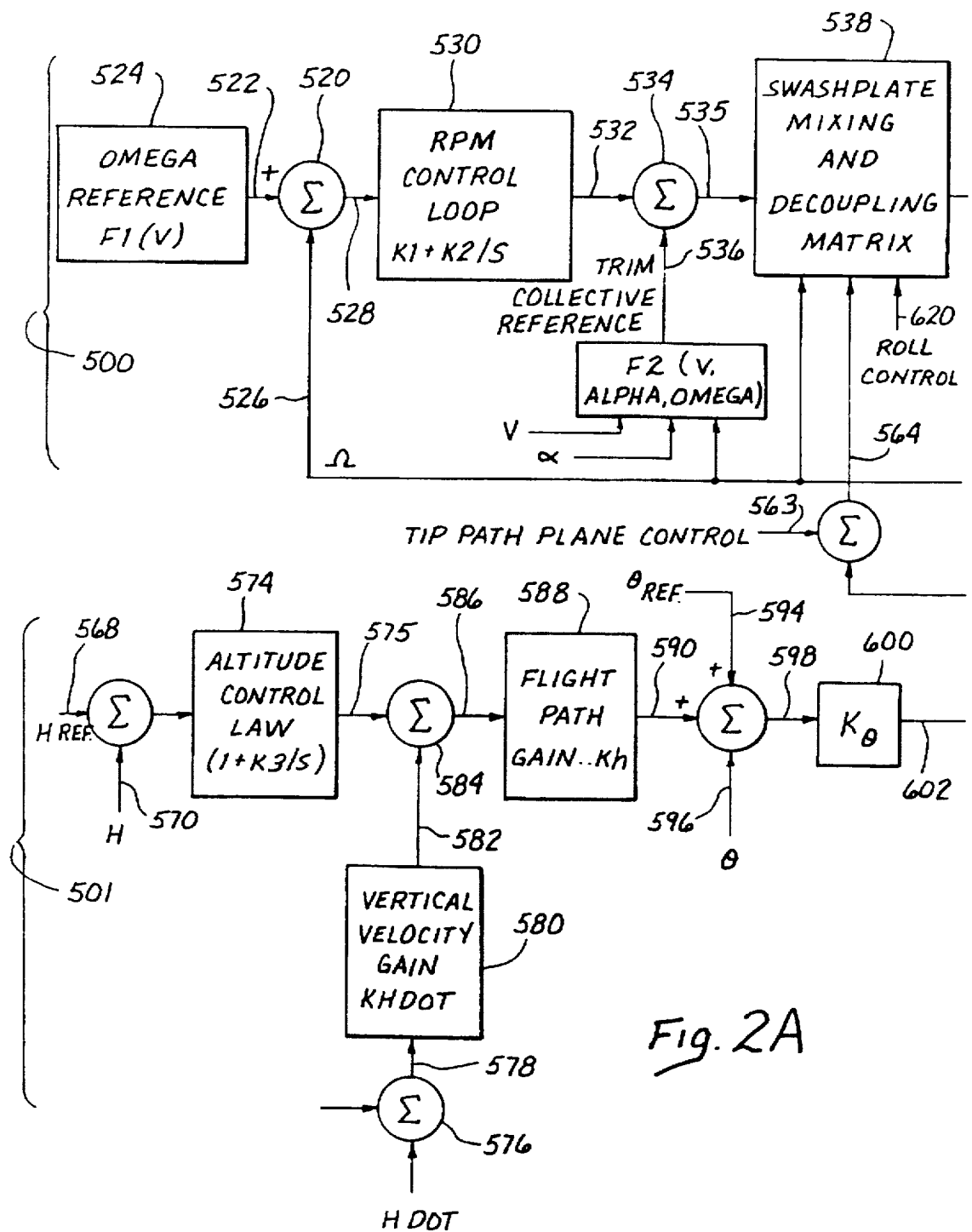
FIG. 2 is a simplified block diagram of the flight control system according to the present invention.
Figure 2B:
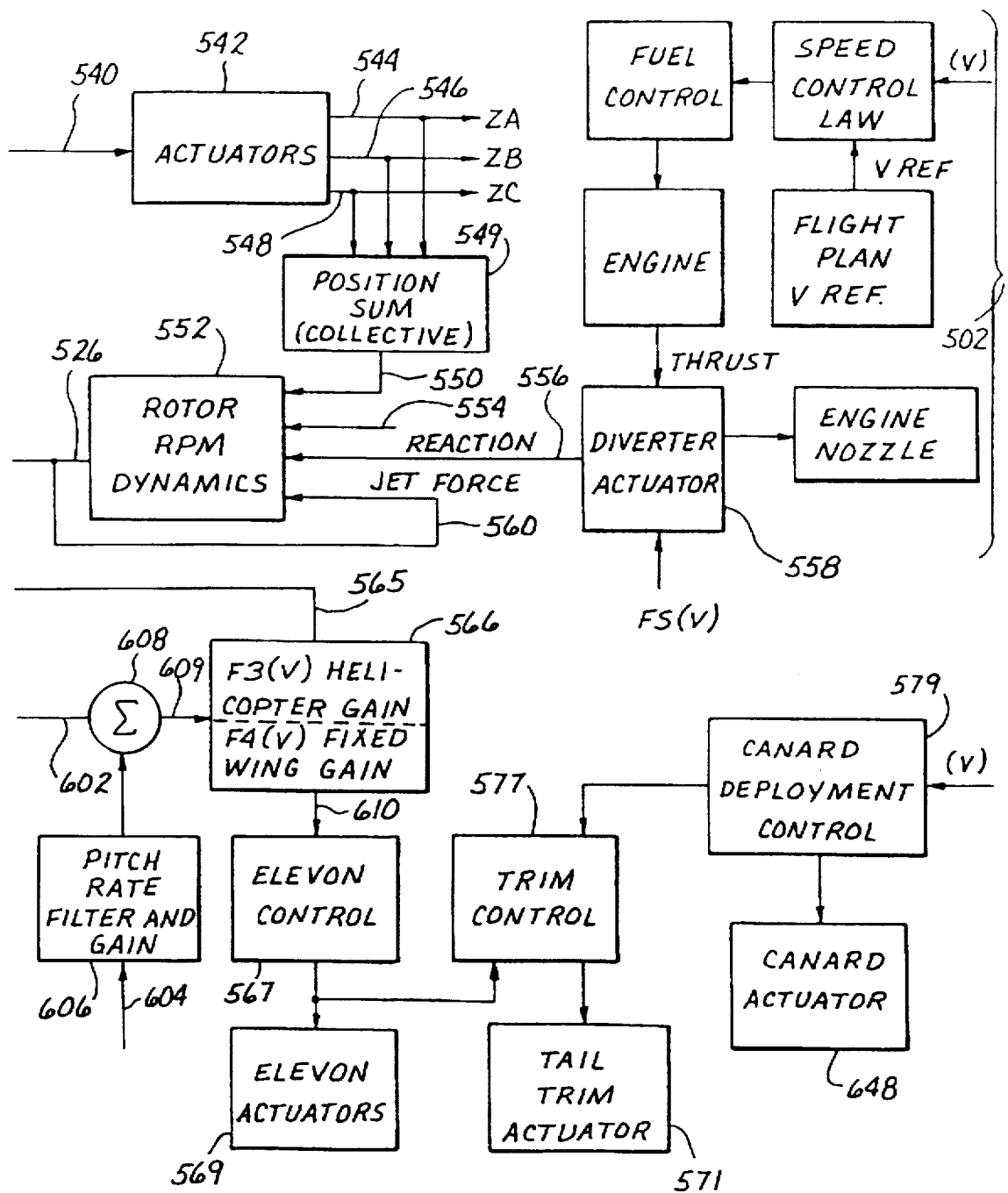

The flight control system for the jet powered tri-mode aircraft is used to illustrate how the present invention is applied to the control of the rotor blade swashplate for managing rotor blade lift moments and cyclic control moments that contribute to the aircraft's attitude control. In the jet powered tri-mode aircraft, rotor blade controls and aerodynamic surface controls operate interactively to smoothly transition lift from rotors to the aero lifting surfaces, and vice versa, depending upon the direction of speed change, while concurrently maintaining precise and stable attitude and flight path control. FIG. 2 is a block diagram of the jet-powered tri-mode aircraft, with the blocks in the 500 group representing the rotor blade controls, including those controls used for rotor blade speed management, the 501 group representing the flight path and attitude stabilization and control functions, including pilot command inputs, and the 502 group representing the engine thrust control functions. A detailed description of the operation of the elements of FIG. 2 is disclosed in copending U.S. patent application Ser. No. 08/568,144, titled "Flight Control System for Jet Powered Tri-Mode Aircraft," of which applicant is the sole inventor, the details of which are incorporated herein by reference.

In the 501 group, an altitude reference 568 is summed (572) with the altitude measurement (570). The difference between these values is input to a proportional plus integral altitude control law (574). The output 575 is summed (584) with a vertical velocity or Hdot error 582, which is formed from the difference between a vertical velocity reference and the Hdot measurement as signal 578, applied through a gain 580. A net Hdot error 586 is applied to a flight path gain 588 to produce a pitch attitude command 590 for correcting the flight path error. The attitude command is summed with the attitude measurement 596 and an attitude reference 594 to produce a net attitude error 598. The attitude reference 594 can include the pilot's inputs, as processed through a stick command processing function not shown. The net attitude error 598, when applied through a gain (and appropriate filter) 600, generates a pitch rate command 602. Pitch rate measurement 604, applied through a vibration filter 606, is summed with 602 in summing junction 608 to produce a pitch rate error 609, which when applied to gains F3(V) and F4(V) to be discussed subsequently is converted to a desired pitch angular acceleration command. The pitch angular acceleration command signal 610 is applied to the aero surface controls, but those aero surface controls are not the subject of the present invention, which relates only to the signal paths that start with 565 and sum with other signals to generate rotor blade control commands appearing in the 500 group of FIG. 2. Note that the stabilization and control functions described in the 501 group are shown for the aircraft's pitch axis only. An analogous group, not shown, also exists for roll stabilization and control. Roll commands to correct for lateral flight path deviations would sum with roll angle measurements, and eventually roll rate measurements, to produce a final roll angular acceleration command. That final roll angular acceleration command is shown as signal 620 being input to block 538, which is discussed subsequently.

The rotor blade swashplate mixing and decoupling matrix 538 accepts a command for rotor blade pitch, equivalent to a collective pitch command (signal 535), where, in this specific, jet powered tri-mode aircraft application, that rotor blade pitch command is being used to control the rotor blade speed $\Omega$ to a desired value. A pitch angular acceleration command 564 and a roll angular acceleration command 620 are also input to the rotor blade swashplate mixing and decoupling matrix 538. The pitch angular acceleration command stems from the pitch-axis-stabilization-and-control error appearing in signal 609, which is then split to the rotor blade control part of the overall flight control system through the gain F3(V) in 566. The gain function F3(V) has a maximum value at hover and at low helicopter speeds, and is reduced toward zero as transition speeds between 60 and 130 knots are reached, with F3(V)=0 at 130 knots. The cyclic pitch control command 565 is summed with a signal referred to as "Tip Path Plane Control" 563 to produce the pitch angular acceleration command 564, which is applied to the mixing and decoupling matrix 538. The purpose of adding the tip path plane control 563 is to permit gyroscopic moment compensation, in addition to adding the amount of cyclical pitch control needed to keep rotor blade lift constant at all blade azimuths, thereby preventing rotor blade flapping due to speed effects on rotor blade lift. The mixing and decoupling matrix 538 also receives a measure of the rotor blade speed $\Omega$ on line 526.

In the presently preferred embodiment, the determination of the spatial phase angle wherein the rotor blade flapping angle should peak is computed by the mixing and decoupling matrix, 538. Any given flapping characteristic, having flapping oscillations with a definable magnitude (rotor blade flapping angle peak) and phase (spatial phase angle where rotor blade flapping angle peaks), will generate corresponding definable pitch and roll angular accelerations. Block 538 knows the required pitch and roll angular accelerations via inputs 564 and 620 and, hence, can define the rotor blade tip path plane associated with the corresponding required rotor blade flapping oscillations (having the required magnitude and phase). There are three actuators connected to the rotor blade swashplate, however, and block 538 must command positions for those three actuators. These three positions, designated $Z_A$, $Z_B$, and $Z_C$, when achieved by the actuators, must translate and rotate the stationary rotor blade swashplate so that the required rotor blade angle peaks are obtained.

It is understood that the functions contained in the rotor blade swashplate mixing and decoupling matrix 538 can be used in any helicopter fly-by-wire system that connects at least three positioning actuators around the stationary rotor blade swashplate. They have been described in the context of the above-referenced "Flight Control System for Jet Powered Tri-Mode Aircraft" application, since the precision of the rotor blade flapping control is especially critical when conversion (rotor blade stop/start) speeds are approached. The control techniques embodied in the present invention are thus key factors in that aircraft's feasibility. In a fly-by-wire application for a conventional helicopter, such as that described in the cited U.S. Pat. No. 5,001,646, however, the implementation of the rotor blade swashplate mixing and decoupling matrix 538 of the present invention can be a direct replacement for the "force and moment decoupling" block 55 of FIG. 2 of the cited patent.

C. Spatial Phase Angle Shift and Gyroscopic Moment Compensation of Rotor Blade Flapping Oscillations 1. Required Rotor Blade Flapping Oscillations for Maneuvering Commands For decoupled control, the pitch angular acceleration command 564 (FIG. 2) should ideally cause the rotor blades to flap (through rotor blade flapping angles, as the spatial phase angle changes) such that the sinusoidally varying positive and negative peaks (maximum values) of those rotor blade flapping angles will align precisely with the aircraft's fore-aft axis. The aircraft's fore-aft axis is referred to as the x axis. Likewise, the roll angular acceleration command 620 (FIG. 2) should ideally cause the rotor blade to flap such that the sinusoidally varying positive and negative peaks of those rotor blade flapping angles will align precisely with the aircraft's lateral axis, which is orthogonal to the x axis and positive in the direction of the right wing. Combinations of pitch angular acceleration commands 564 and roll angular acceleration commands 620 should result in alignment of the rotor blade flapping angle peaks in accordance with the vector sum of the two commands. If the pitch angular acceleration command 564 is called qdotcmd and the roll angular acceleration command 620 is called pdotcmd, then the resultant, R, will be:

$$R = \sqrt{(qdotcmd)^2 + (pdotcmd)^2} \quad \text{Equation 1}$$

and the phase shift of the peaks, measured from the x-axis forward will be:

$$\text{Phase} = \arctan \frac{(pdotcmd)}{(qdotcmd)} \quad \text{Equation 2}$$

The control solution of the present invention will position the rotor blade swashplate so that the peaks of the rotor blade flapping angles occur with the desired spatial phase angle (to thereby orientate the positive and negative peaks as desired) under all conditions, including those where flapping phase characteristics (including the spatial phase angle) vary as the conditions of flight change. Those changing flight conditions include rotor blade speed, aircraft speed, and gyroscopic moments on the rotor blade caused by aircraft pitch and roll rates. The control solution described herein issues three position commands to three rotor blade swashplate actuators. These position commands define a required rotor blade swashplate tilt and average displacement corresponding to collective pitch. That rotor blade swashplate tilt is computed to be the precise value needed to achieve the rotor blade flapping phase and amplitude that will generate the pitch and roll angular accelerations commanded by the stabilization and control system. A description of the means for generating the desired rotor blade swashplate tilt and collective position is given below.

Figure 3:
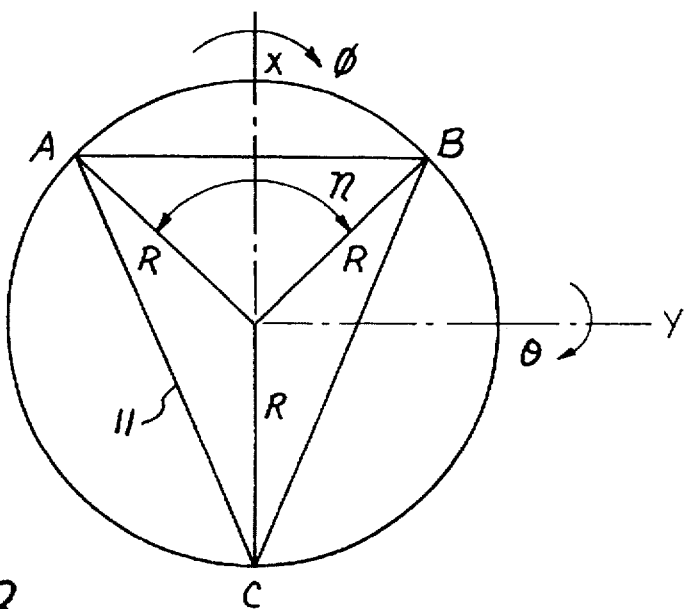
FIG. 3 is a top planar geometrical view of a rotor blade stationary swashplate with actuator connections.

2. Rotor Blade Swashplate Actuator Commands for Generating Required Tilt Angles and Collective Position FIG. 3 shows a top planar view of a rotor blade swashplate having three rotor blade swashplate actuators attached thereto. The rotor blade swashplate has a triangle 11 superimposed thereon. A first rotor blade swashplate actuator 13 is attached to a first corner of the triangle 11, a second rotor blade swashplate actuator 15 is attached to a second corner of the triangle 11, and a third rotor blade swashplate actuator 17 is attached to a third corner of the triangle 11. The first, second, and third rotor blade swashplate actuators, 13, 15, and 17 are subsequently represented in schematic and mathematical form as A, B, and C, respectively.

At a minimum, the first rotor blade swashplate actuator 13, the second rotor blade swashplate actuator 15, and the third rotor blade swashplate actuator 17 must be located at the three vertices of the triangle 11, which is inscribed on the rotor blade swashplate in this figure to illustrate geometric relationships. It is noted that the triangle 11 is ideally equilateral, but there are usually physical constraints which prevent ideal configurations. Hence, the triangle 11 is illustrated with the angle $\eta$ used as a variable to describe departure from an equilateral triangle. In an equilateral triangle $\eta=120$ degrees. In order to define the desired combination of cyclic and collective control, these three rotor blade swashplate actuators 13, 15, and 17, must be independently controlled. Although more rotor blade swashplate actuators may be used, these-three rotor blade swashplate actuators 13, 15, and 17 are sufficient to provide the basis for main rotor blade control in a conventional single rotor blade aircraft configuration.

Looking at FIG. 3, the first rotor blade swashplate actuator 13 is commanded to move its corner of the triangle 11 in vertical directions represented by the variable $Z_A$. Similarly, the second rotor blade swashplate actuator 15 and the third rotor blade swashplate actuator 17 move corresponding vertices of the triangle 11 about vertical displacements $Z_B$ and $Z_C$, respectively. The vertical displacement of the center of the triangle 11 is denoted by the variable $Z_O$.

The variable $\phi$ denotes the angle of the rotor blade swashplate about the x-axis, and the variable $\theta$ denotes the angle of the rotor blade swashplate about the y-axis. When the x-axis and y-axis are properly oriented with respect to the aircraft x-axis and y-axis, the $\phi$ and $\theta$ angles correspond to the conventional lateral and longitudinal cyclic controls, respectively, and the variable $Z_O$ corresponds to the rotor blade swashplate collective control output. A discussion of longitudinal and lateral cyclic controls is provided in U.S. Pat. No. 5,001,646 to Caldwell et al., issued on Mar. 19, 1991, and incorporated herein by reference. The geometric relationships for $Z_O$, $\theta$, and $\phi$ in terms of known constants or controllable quantities $\eta$, $Z_A$, $Z_B$, $Z_C$, and the rotor blade swashplate radius R are given by:

$$Z_0 = \frac{\frac{1}{2}Z_A + \frac{1}{2}Z_B + \cos\frac{\eta}{2} Z_C}{1 + \cos\frac{\eta}{2}} \quad \text{Equation 3}$$

$$\theta = \frac{Z_A + Z_B - 2Z_C}{2R\left(\cos\frac{\eta}{2} + 1\right)} \quad \text{Equation 4}$$

$$\phi = \frac{Z_A - Z_B}{2R\sin\frac{\eta}{2}} \quad \text{Equation 5}$$

The desired values of $Z_O$, $\theta$, and $\phi$ are computed by the rotor blade swashplate mixing and decoupling matrix 588 (FIG.

2), and then these three values are converted to the necessary vertical displacements for the first rotor blade swashplate actuator 13, the second rotor blade swashplate actuator 15, and the third rotor blade swashplate actuator 17. The three equations for the first, second, and third rotor blade swashplate actuator vertical displacements $Z_A$, $Z_B$, and $Z_C$ are given by:

$$Z_A = Z_0 + \theta R \cos \frac{\eta}{2} + \phi R \sin \frac{\eta}{2} \quad \text{Equation 6}$$

$$Z_B = Z_0 + \theta R \cos \frac{\eta}{2} - \phi R \sin \frac{\eta}{2} \quad \text{Equation 7}$$

$$Z_C = Z_0 - \theta R \quad \text{Equation 8}$$

The matrix representation of these three equations is given by:

$$\begin{bmatrix} Z_A \\ Z_B \\ Z_C \end{bmatrix} = \begin{bmatrix} 1 & R\cos\frac{\eta}{2} & R\sin\frac{\eta}{2} \\ 1 & R\cos\frac{\eta}{2} & -R\sin\frac{\eta}{2} \\ 1 & -R & 0 \end{bmatrix} \begin{bmatrix} Z_0 \\ \theta \\ \phi \end{bmatrix} \quad \text{Equation 9}$$

3. Correcting the Spatial Phase Angle of the Rotor Blade Flapping Angle Peaks If one assumes that the rotor blade swashplate is aligned so that tilting it through the angle $\theta$ will change the spatial phase angle ($\psi$) of the rotor blade flapping angle peaks such that those rotor blade flapping angle peaks will produce a pure pitching moment, and that a tilt through the angle $\phi$ will produce a pure rolling moment on the aircraft, then Equation 9 will define the required rotor blade flapping angles $\beta$ and the associated rotor blade swashplate collective. However, in order to achieve true decoupled control, provision must be made for the actual spatial phase angle $\psi$ of the rotor blade flapping angle $\beta$ peaks. That actual spatial phase angle $\psi$ does not necessarily align with the aircraft x-axis for a pure $\theta$ tilt angle of the rotor blade swashplate, for example. Specifically a spatial phase angle shift exists between the aircraft x-axis and the peak of the rotor blade flapping angles $\beta$, resulting from a pure $\theta$ tilt of the rotor blade swashplate. That spatial phase angle $\psi$ shift is designated as the angle $\xi$, and it may result from a fixed geometric rotation of the rotor blade swashplate, motivated by physical installation considerations, or by variable phase effects caused by the dynamics of the rotor blade flapping response. The below rotor blade flapping angle $\beta$ equation defines the rotor blade flapping angle $\beta$, which is defined by the coning angle $a_0$, and the first harmonic rotor blade flapping excursions referenced to the spatial phase angle $\psi$ of the rotor blade:

$$\beta = a_0 - a_{1s} \cos(\psi) - b_{1s} \sin(\psi) \quad \text{Equation 10}$$

The variables $a_{1s}$ and $b_{1s}$ are related to the lateral and longitudinal controls as follows:

$$a_{1s} = -B_1 \cdot \theta_{swashplate} \quad \text{Equation 11}$$

$$b_{1s} = A_1 \cdot \phi_{swashplate}$$

where $B_1$ is the conventional helicopter longitudinal cyclic, positive for rotor blade swashplate tilted down toward the aircraft nose, and $A_1$ is the conventional helicopter lateral cyclic, positive for the rotor blade swashplate tilted downward toward the right (from the pilot's view).

The rotor blade flapping angle $\beta$ describes the amount that the rotor blade 19 of the jet-powered tri-mode aircraft 11 is deflecting as it flaps up and down, like a bird's wing, with respect to the hub. As described in Equation 10, this rotor blade flapping angle $\beta$ varies as the rotor blade 19 rotates through 360 degrees of spatial phase angles (one rotation).

Equation 10 shows that $\beta$ is equal to a function of the longitudinal and lateral cyclic controls and the rotor blade's spatial phase angle $\psi$. Thus, the rotor blade flapping angle $\beta$ varies sinusoidally between positive and negative peaks for each rotation of the rotor blade 19. For the two bladed teetering rotor, as represented by the jet powered tri-mode aircraft of the presently preferred embodiment, the required longitudinal control action for producing a pitch angular acceleration should cause sinusoidal excursions of $\beta$ that are symmetrical, that is, aligned, with the aircraft's x-axis. When any of a variety of influences on rotor blade dynamics, such as rotor blade speed, aircraft speed, and rotor blade configuration are introduced the $\beta$ peak may no longer occur at a spatial phase angle $\psi = \pi$ for a pure $\theta$ tilt, and, instead, the peak $\beta$ will likely occur at a spatial phase angle $\psi = (\pi - \xi)$.

Figure 4:
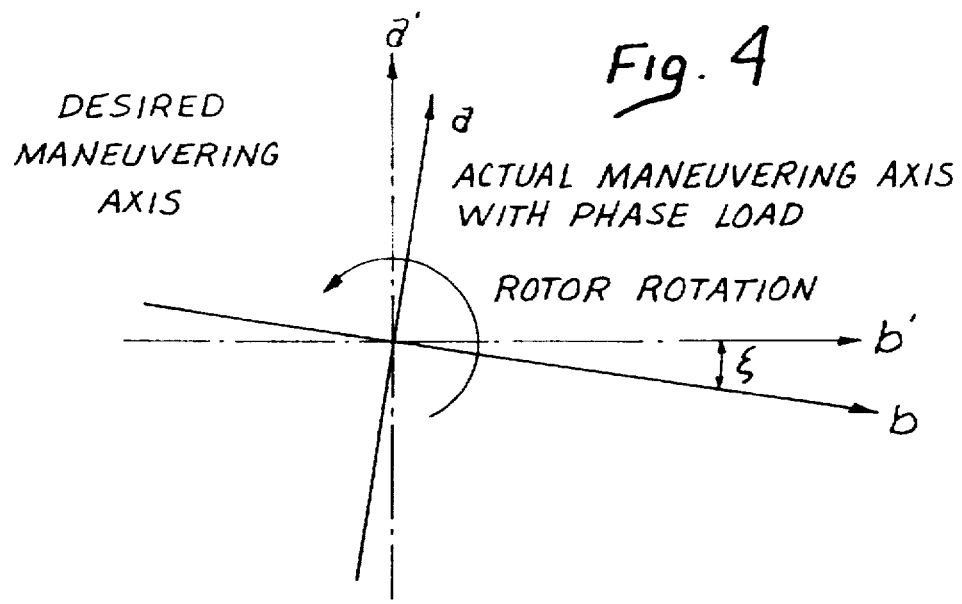
FIG. 4 illustrates rotation of control axes for compensating for phase lead, according to the presently preferred embodiment.

As shown in FIG. 4, the control command will have to be rotated into the desired maneuvering axis designated by a', b'. To produce the correct values of the rotor blade swashplate tilt angles $\theta$ and $\phi$ for a maneuvering command, the a and b vectors of FIG. 4 must be rotated into the a' and b' frames through the spatial phase angle shift $\xi$, in order to obtain decoupled pitch and roll control. That rotation should be in accordance with:

$$\begin{bmatrix} a' \\ b' \end{bmatrix} = \begin{bmatrix} \cos\xi & -\sin\xi \\ \sin\xi & \cos\xi \end{bmatrix} \begin{bmatrix} a \\ b \end{bmatrix} \quad \text{Equation 12}$$

where a and b represent pitch and roll angular acceleration commands, respectively, when the spatial phase angle shift $\xi$ is not known. If a positive pitch angular acceleration is required, that is, an increase in the rotor blade tip path plane forward along the aircraft x-axis, then an "a" command is issued. The "a" command must result in a rotor blade swashplate tilt angle that will cause the rotor blade 19 to achieve its flapping peak when pointing straight ahead. Thus, a pure pitch angular acceleration command should generate an "a" command or a $\theta$ tilt angle of the rotor blade swashplate when there is no spatial phase angle shift $\xi$. Equation 12 gives the component of a' and b' representing the corrected $\theta$ and $\phi$ tilts of the rotor blade swashplate needed to delay the rotor blade flapping angle peak back to $\psi = \pi$ from $\psi = (\pi - \xi)$ radians when flight conditions result in a spatial phase angle lead of $\xi$. If one is trying to achieve a pure pitch angular acceleration with a nominal value of "a," corresponding to some specific value of $\theta$ tilt, the result will be:

$$a' = a \cos \xi$$

$$b' = a \sin \xi$$

Figure 5:
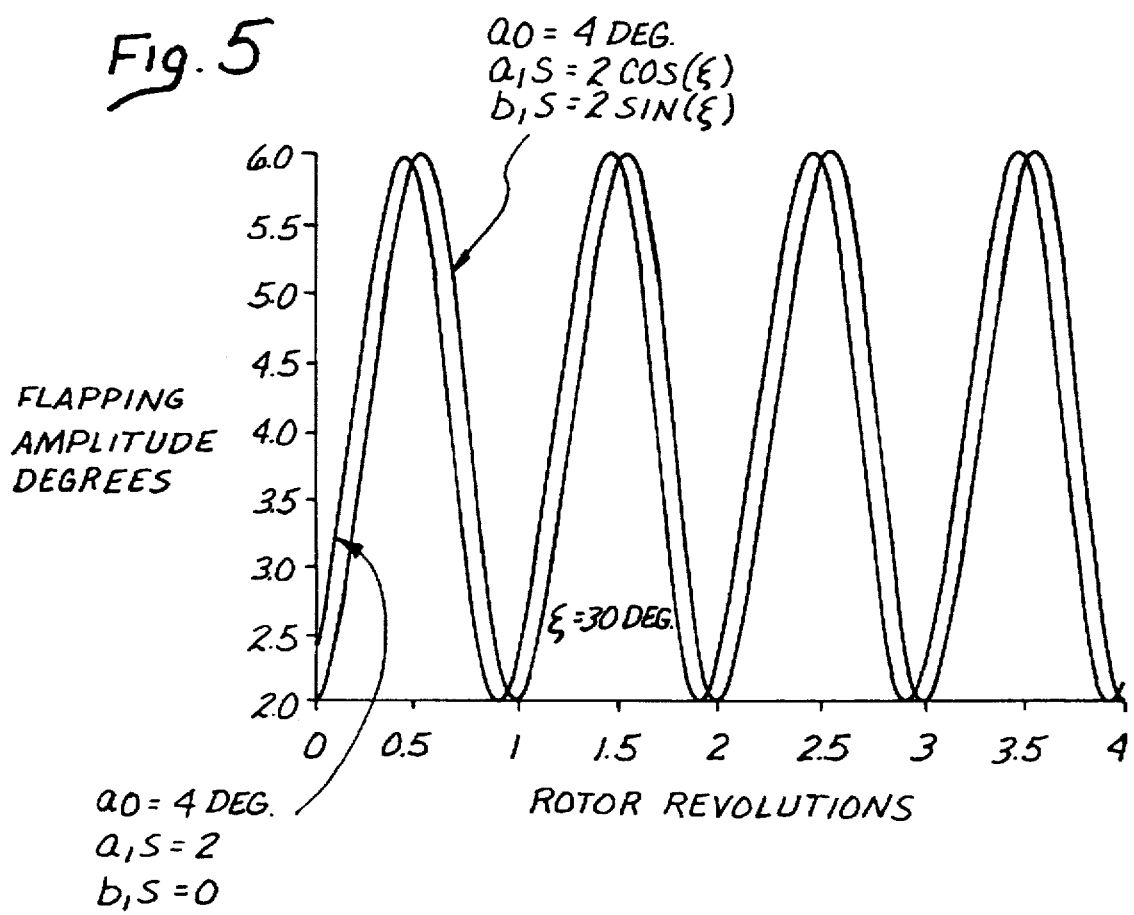
FIG. 5 is a plot of flapping angle vs. rotor blade revolutions, according to the presently preferred embodiment.

The example illustrated in FIG. 5 shows how the spatial phase angle of the rotor blade flapping angle peak varies with respect to the aircraft x-axis reference, from which rotor blade spatial phase angle is measured, as $a_{1s}$ and $b_{1s}$ (and, hence, the $\theta$ and $\phi$ tilt angles) are changed. FIG. 5 is thus a representation of Equation 10, with two different sets of values of $a_{1s}$ and $b_{1s}$. The relative spatial phase angle of the peak rotor blade flapping angles, with respect to the rotor blade's spatial phase angle $\psi$, changes as different values of $a_{1s}$ and $b_{1s}$ are used. FIG. 5 thus shows the phase effect of combinations of $\theta$ and $\phi$ tilt-angle rotations of the rotor blade swashplate, where $a_{1s}$ corresponds to a positive $\theta$ tilt angle and $b_{1s}$ corresponds to a positive $\phi$ tilt angle (a rotation of the rotor blade swashplate down to the right). As seen in this figure, if a positive "b" is added to a pure "a" vector (b=0), then the spatial phase angle of peak rotor blade flapping angle shifts toward an increasing ψ angle. (Note that ψ in this figure is measured in revolutions; one revolution=2π radians.) The desired situation, for a pure pitch angular acceleration is for the peak rotor blade flapping angles to occur at ψ=π radians or 0.5 revolutions. In FIG. 5, a spatial phase angle shift ξ of π/6 radians is assumed. When a value of $a_{1s}=2$ and $b_{1s}=0$ is used, the spatial phase angle shift ξ causes the peak rotor blade flapping angle to lead alignment with ψ=π. In FIG. 5, it is demonstrated that performing the transformation in accordance with Equation 12 accomplishes the desired alignment with the aircraft x-axis axis (ψ=π radians). That transformation specifically covers the case described above where:

$$a'=a \cos \xi$$

$$b'=a \sin \xi$$

The value of the spatial phase angle shift ξ is estimated analytically in the presently-described embodiment and applied to the control commands to accomplish the desired decoupling. The value of ψ is a function of aircraft speed, rotor blade speed, thrust coefficient, and rotor blade configuration. These analytic relationships tend to be approximate, so that wind tunnel calibration, with refinements obtained from flight testing, may be a more appropriate method of establishing a look-up table function for the spatial phase angle shift ξ.

4. Compensation for Gyroscopic Moments on Rotor Blade Due to Aircraft Angular Rates Gyroscopic effects occur on the rotating rotor blade 19 when the tip path plane of the rotor blade 19 is changed. These gyroscopic effects prevent the rotor blade flapping angle from peaking at the same time that the rotor blade swashplate tilt angle (the combined θ and φ tilt angles) peaks. There is a phase difference between the angle at which the rotor blade swashplate is rotated to its maximum value and when the rotor blade flapping excursion is maximum. That phase difference is associated with the dynamics of many forces acting on the rotor blade. The gyroscopic effect generated from changes in the orientation of the rotor blade tip path plane is one of the dominant contributions to the dynamics of that process. The nominal phase difference between the peak of the rotor blade flapping angles and the peak of the rotor blade swashplate tilt angle (φ and θ tilt angles) is conventionally accommodated in the orientation of the rotor blade swashplate and the associated pitch links that cause the rotor blade tip path plane to change in proportion to rotor blade swashplate angles and displacements. The present invention addresses the problem of variations from the nominal phase differences. Those variations appear in the spatial phase angle shift ξ. Other gyroscopic effects in addition to those discussed above involve moments associated with pitch rate and roll rate maneuvers or disturbances to the aircraft 11. They are normally accommodated by a helicopter pilot by adjusting lateral and longitudinal cyclic control position. In automatically controlled helicopters or control augmented helicopters, the attitude and attitude rate feedback loops attempt to correct for these gyroscopic moments that act on the rotor blade tip path plane. This type of automatic control will occur during the helicopter mode of control in the system of the presently preferred embodiment. It has been shown, however, that when the rotor blade control gains are reduced toward zero with increasing aircraft travelling velocity as conversion speed is approached, rotor blade flapping is also reduced toward zero. With these low rotor blade control gains, gyroscopic moments on the rotor blade disc due to aircraft attitude rates will cause an undesired flapping excitation unless compensating θ and φ rotations of the rotor blade swashplate are added. It is desired that the rotor blade not flap when conversion speed is approached and the lift generated by the rotor blade 19 approaches zero. If the rotor blade 19 had very low lifting forces and the jet-powered tri-mode aircraft experienced a pitch rate, gyroscopic moments from that angular velocity will appear as a rolling moment on the rotor blade tip path plane. For example, an aircraft maneuver causing a nose-up pitch rate would result in a gyroscopic moment on the rotor blade disc in the direction of a right roll. Thus, a cyclic roll command is executed by the present invention to compensate for the predicted amount of flapping that will be caused by the aircraft maneuver. These gyroscopic moments, and the value of rotor blade swashplate angle compensations needed to cancel them, are analytically definable and can be shown to be functions of p, q, Ω, μ and ε, where:

p and q are roll rate and pitch rate, respectively,

Ω=rotor blade speed (radians per second),

μ=advance ratio (=forward speed/α), and

ε=hinge offset (not relevant to the 2-bladed teetering rotor blade of the jet-powered tri-mode aircraft 11 of the presently preferred embodiment).

All of these parameters are available from on-board measurements, so that computations of the desired compensations can be incorporated into the control system.

D. Algorithms in the Rotor Blade Swashplate Mixing and Decoupling Matrix

Figure 6A:
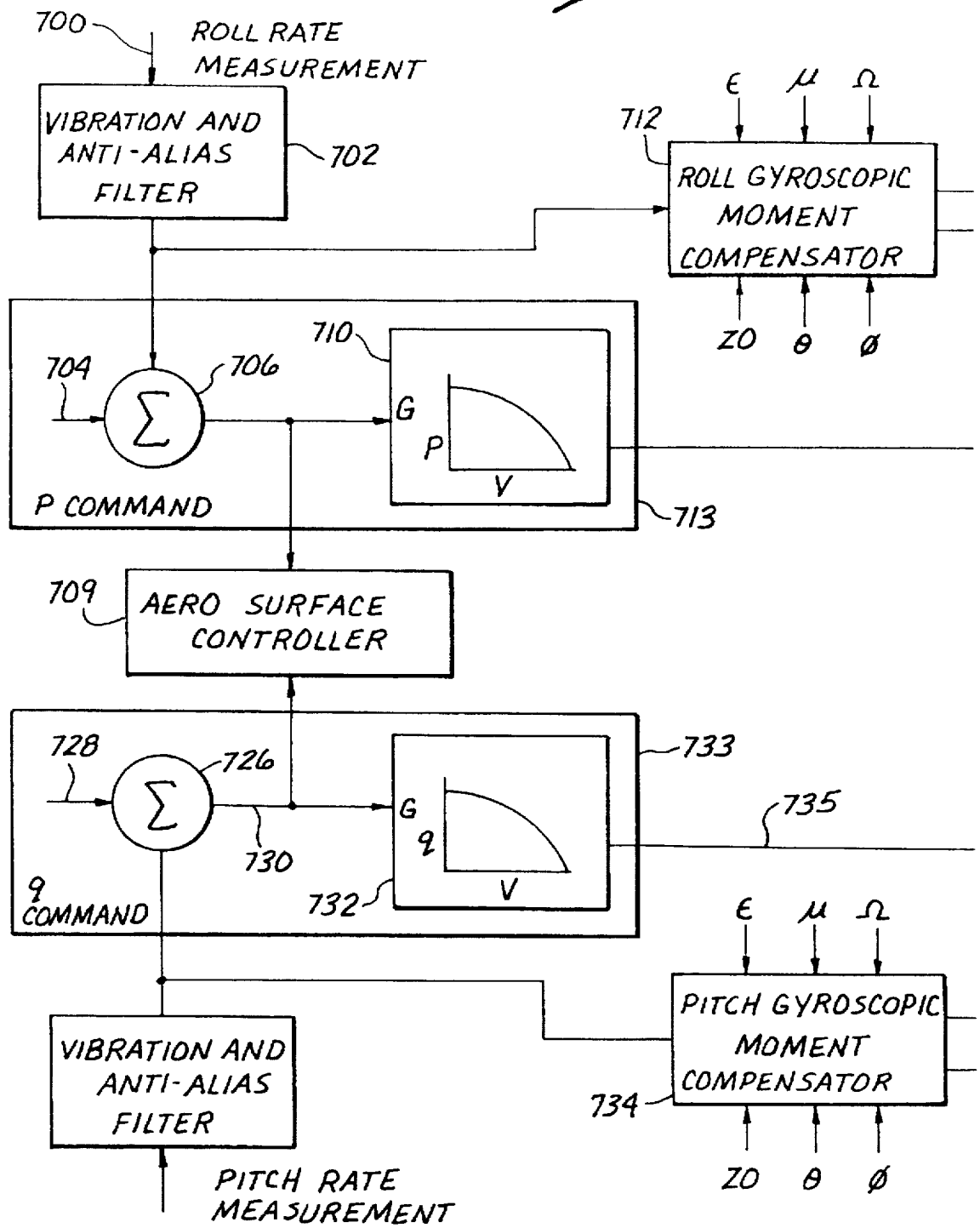
FIG. 6 is a block diagram illustrating rotor blade swashplate-axis rotation and gyroscopic moment compensation, according to the presently preferred embodiment.
Figure 6B:
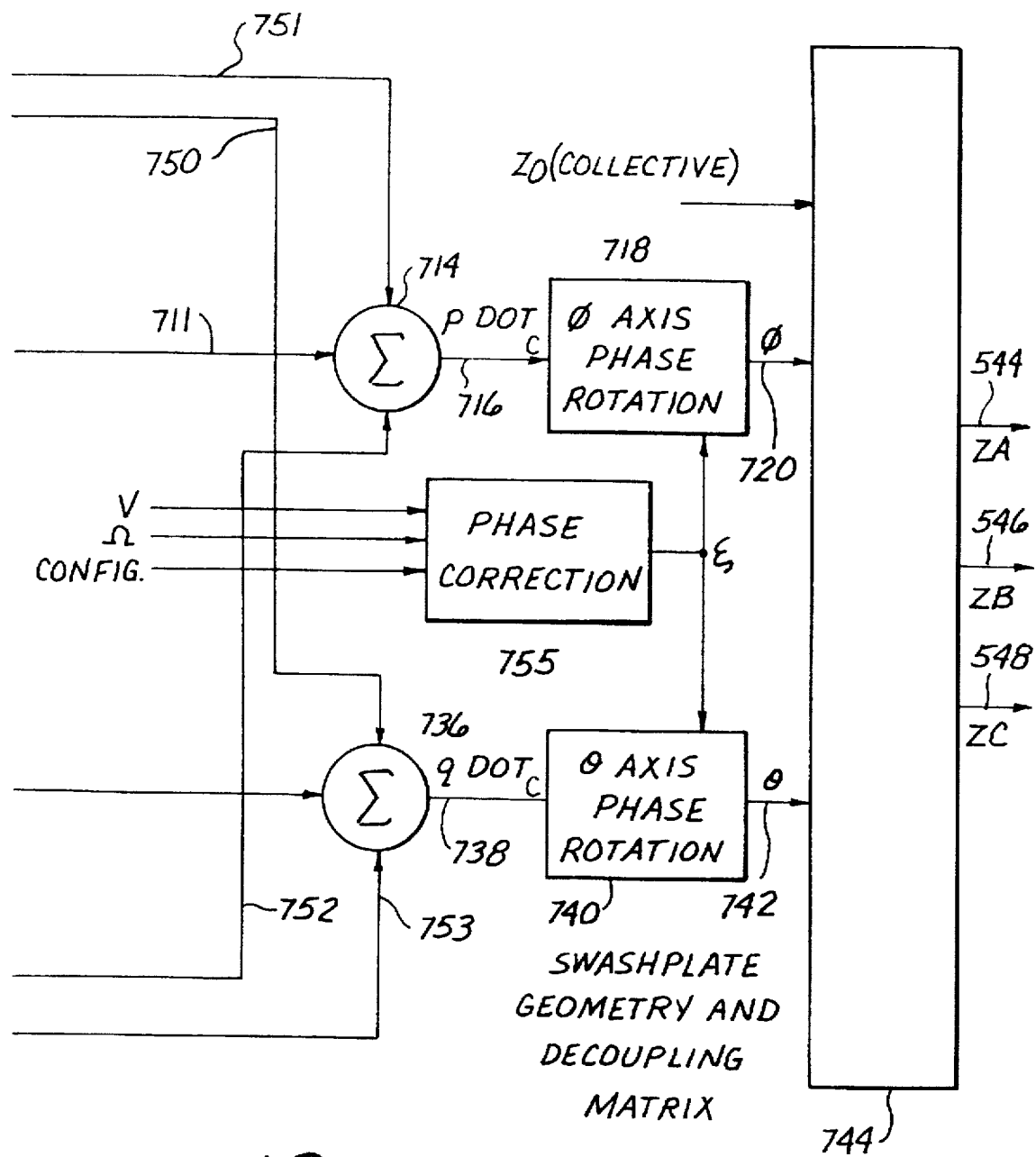

FIG. 6 is a block diagram illustrating the different algorithms implemented to control the rotor blade swashplate. This figure shows how the three rotor blade swashplate actuator position commands $Z_A$, $Z_B$, and $Z_C$ are computed based on the stabilization and control outputs, the computed flapping phase correction to the spatial phase angle shift ξ, and upon the gyroscopic compensations.

1. Stabilization and Control θ and φ Values

The left side of FIG. 6 repeats functions shown in the 501 group of FIG. 2. Thus the q command 728 of FIG. 6 is the same as 602 in FIG. 2, and the q summing junction 726 in FIG. 6 is the same as the summing junction 608 in FIG. 2. The following tabulation shows equivalent elements of FIG. 6 and FIG. 2.

| FIG. 6 Elements | Equivalent FIG. 2 Elements |
| --- | --- |
| 728 | 602 |
| 726 | 608 |
| 724 | 606 |
| 722 | 604 |
| 730 | 609 |
| 732 | 566 |
| 711 | 620 |
| 734 | 564 |

The roll stabilization function 713 of FIG. 6 is identical to the pitch stabilization function 733, except that roll rate measurement and roll rate command 700 and 704, respectively, are substituted for the pitch rate measurement 722 and pitch rate command 728, and the control axis gain function for roll 710 differs from the pitch gain function 732. FIG. 6 emphasizes that stabilization and control functions for the pitch and roll axis, respectively, result in pitch angular acceleration output command 735 and roll angular acceleration command 711. These commands are processed to produce the desired rotor blade flapping with appropriate spatial phase angle, compensated for all conditions of flight which affect that phase.

2. Gyroscopic Moment θ and φ Values

The gyroscopic moment correction for a roll rate is computed by the roll gyroscopic moment compensator 712, which receives the filtered measurement of roll rate 703 plus other variables needed in the computation. These other variables include the rotor blade speed $\Omega$, the hinge offset $\epsilon$, the advance ratio $\mu$, $Z_0$, θ, and φ. The roll gyroscopic moment compensator 712 generates an estimate of tip path plane angle of attack $\alpha$. That estimate is made from the measured inertial angle of attack of the aircraft, as corrected for rotor blade flapping. The inertial angle of attack is defined as the aircraft pitch attitude minus the aircraft flight path angle $\gamma$. This aircraft flight path angle $\gamma$ is defined as vertical velocity divided by forward velocity. The flapping estimate is obtained from average values of the three rotor blade swashplate parameters $Z_0$, θ, and φ, aircraft velocity, and air density. Air density is derived in the conventional manner for computing air data parameters, that is, from pressure, altitude, and temperature measurements.

The roll gyroscopic moment compensator 712 converts the filtered measurement of the roll rate 703 into a gyroscopic moment correction having two components. The dominant component is a pitch angular acceleration command 750, which is summed with other pitch angular acceleration commands at summing junction 736. Also generated by the roll gyroscopic moment compensator 712 is a secondary roll angular acceleration command 751, which sums with the roll angular acceleration command 711 from the stabilization and control at summing junction 714. In a symmetrical manner, the pitch gyroscopic compensator 734 generates a primary roll angular acceleration compensation command 752 and a secondary pitch angular acceleration command 753. These two compensation commands 752, 753 sum at summing junctions 714 and 736, respectively. Summing junction 714 therefore outputs a total roll angular acceleration command 716, which contains the sum of the stabilization and control requirements 711 and the gyroscopic moment corrections 751, 572 resulting from aircraft pitch and roll rates. Likewise, summing junction 736 outputs the total pitch angular acceleration command 738, comprising the sum of the stabilization and control command 735 and gyroscopic moment compensations 750, 753.

3. Spatial Angle Phase Shift θ and φ Values

If the spatial phase angle shift $\xi$ of the rotor blade flapping angle peaks is zero, command 716 will correspond to the rotor blade swashplate φ tilt angle, and command 738 will correspond to the rotor blade swashplate θ tilt angle. The system, however, must first compute the value of the spatial phase angle shift $\xi$, performed in the phase correction block 755. That phase correction is computed as a function of velocity V, rotor blade speed $\Omega$, and unique rotor blade configuration information, including rotor blade swashplate installation tolerances and deliberate rotations.

After $\xi$ is determined by the phase correction block 755, it is output to both the φ axis phase rotation block 718 and the θ axis phase rotation block 740. The φ axis phase rotation block 718 is the lower part of matrix Equation 12:

$$b' = a \sin \xi + b \cos \xi,$$

where a is the total pitch angular acceleration command 738, and b is the total roll angular acceleration command 716. The θ axis phase rotation is the top half of equation 12:

$$a' = a \cos \xi - b \sin \xi,$$

Output a' is therefore equal to the θ tilt angle command 742, and output b' is the φ tilt angle command 720. Knowing the required value of θ, φ, and $Z_0$ (the latter from the collective control loop used to control rotor blade speed in the jet-powered tri-mode aircraft 11), the system uses rotor blade swashplate geometry Equations 6, 7, and 8 to generate position commands to the three rotor blade swashplate actuators, 13, 15, and 17 (FIG. 3). The outputs $Z_A$ 544, $Z_B$ 546, and $Z_C$ 548 are those position commands.

I claim:

1. An apparatus for controlling a tip path plane of a rotating rotor blade of an aircraft having rotor blade controls, the apparatus controlling the tip path plane to eliminate axis cross-coupling from the rotor blade controls of the aircraft, the apparatus comprising:

(a) a rotor blade swashplate;

(b) at least three actuators for controlling a translation and a tilt angle of the rotor blade swashplate;

(c) a fly-by-wire computer system for issuing position commands to the three actuators;

(d) a first inputting channel for inputting first inputs, for use in determining a spatial phase angle at which flapping oscillations of the rotor blade obtain maximum values, the first inputs including:
  (1) a measured rotor blade speed;
  (2) a measured aircraft speed; and
  (3) measured rotor blade swashplate positions;

(e) a second inputting channel for inputting second inputs, for use in determining gyroscopic moments on the rotor blade, the second inputs including:
  (1) measured changes in a pitch of the aircraft; and
  (2) measured changes in a roll of the aircraft;

(f) a first determiner for determining a required translation and tilt angle of the rotor blade swashplate so that the maximum values of the resulting rotor blade flapping oscillations will occur in alignment with a vector sum of a desired angular acceleration of the aircraft;

(g) a second determiner for determining specific positions of the three rotor blade swashplate actuators that will cause the rotor blade swashplate translation and tilt angle determined by the first determiner;

(h) a third determiner for determining a changing phase shift of the maximum values of the rotor blade flapping oscillations as the measured rotor blade speed changes, the measured aircraft speed changes, and a rotor blade lift changes;

(i) a first gyroscopic moment compensator for generating:
  (1) an aircraft-pitch gyroscopic moment compensation to aircraft roll, the aircraft-pitch gyroscopic moment compensation to aircraft roll cancelling any longitudinal gyroscopic moments generated by a roll rate of the aircraft; and
  (2) an aircraft-roll gyroscopic moment compensation to aircraft roll, the aircraft-roll gyroscopic moment compensation to aircraft roll cancelling any lateral gyroscopic moments generated by a roll rate of the aircraft; and (j) a second gyroscopic moment compensator for generating:
  (1) an aircraft-pitch gyroscopic moment compensation to aircraft pitch, the aircraft-pitch gyroscopic moment compensation to aircraft pitch cancelling any longitudinal gyroscopic moments generated by a pitch rate of the aircraft; and
  (2) an aircraft-roll gyroscopic moment compensation to aircraft pitch, the aircraft-roll gyroscopic moment compensation to aircraft pitch cancelling any lateral gyroscopic moments generated by a pitch rate of the aircraft.

2. The apparatus for controlling a tip path plane of a rotating rotor blade according to claim 1, wherein the aircraft comprises one of either a helicopter aircraft, or a combined helicopter and fixed wing aircraft during transition between a helicopter and a fixed-wing flight.

3. The apparatus for controlling a tip path plane of a rotating rotor blade according to claim 1, wherein the apparatus further comprises a signal combiner for combining the aircraft-pitch gyroscopic moment compensation to aircraft roll and the aircraft-pitch gyroscopic moment compensation to aircraft pitch, and for combining the aircraft-roll gyroscopic moment compensation to aircraft roll and the aircraft-roll gyroscopic moment compensation to aircraft pitch.

4. An apparatus for computing and controlling an orientation and position of a rotor blade swashplate in an aircraft fly-by-wire flight control system, the apparatus comprising:
   a first rotor blade swashplate actuator;
   a second rotor blade swashplate actuator;
   a third swashplate actuator;
   a rotor-blade swashplate controller for controlling the first rotor blade swashplate actuator, the second rotor blade swashplate actuator, and the third rotor blade swashplate actuator in order to control the orientation and position of the rotor blade swashplate;
   a rotor-blade swashplate compensator for generating and outputting to the rotor-blade swashplate controller a first rotor blade swashplate actuator commanded position, a second rotor blade swashplate actuator commanded position, and a third rotor blade swashplate actuator commanded position, the rotor-blade swashplate compensator compensating for a flapping angle phase lead of the rotor blade swashplate by adjusting the first rotor blade swashplate actuator commanded position, the second rotor blade swashplate actuator commanded position, and the third rotor blade swashplate actuator commanded position to introduce a flapping angle phase lag, to thereby cancel the flapping angle phase lead.

5. The apparatus for computing and controlling an orientation and position of a rotor blade swashplate according to claim 4, wherein the apparatus further comprises;
   a first inputting channel for inputting first inputs, for use in determining a spatial phase angle at which flapping oscillations of the rotor blade obtain maximum values, the first inputs including:
      a measured rotor blade speed;
      a measured aircraft speed; and
      measured rotor blade swashplate positions;
   a second inputting channel for inputting second inputs, for use in determining gyroscopic moments on the rotor blade, the second inputs including:
      measured changes in a pitch of the aircraft; and
      measured changes in a roll of the aircraft;
   a determiner for determining a required translation and tilt angle of the rotor blade swashplate so that the maximum values of the resulting rotor blade flapping oscillations will occur in alignment with a vector sum of a desired angular acceleration of the aircraft;
   a first gyroscopic moment compensator for generating:
      an aircraft-pitch gyroscopic moment compensation to aircraft roll, the aircraft-pitch gyroscopic moment compensation to aircraft roll cancelling any longitudinal gyroscopic moments generated by a roll rate of the aircraft; and
      an aircraft-roll gyroscopic moment compensation to aircraft roll, the aircraft-roll gyroscopic moment compensation to aircraft roll cancelling any lateral gyroscopic moments generated by a roll rate of the aircraft; and
   a second gyroscopic moment compensator for generating
      an aircraft-pitch gyroscopic moment compensation to aircraft pitch, the aircraft-pitch gyroscopic moment compensation to aircraft pitch cancelling any longitudinal gyroscopic moments generated by a pitch rate of the aircraft; and
      an aircraft-roll gyroscopic moment compensation to aircraft pitch, the aircraft-roll gyroscopic moment compensation to aircraft pitch cancelling any lateral gyroscopic moments generated by a pitch rate of the aircraft.

6. The apparatus for computing and controlling an orientation and position of a rotor blade swashplate according to claim 5, wherein the apparatus further comprises a rotor blade swashplate.

7. The apparatus for computing and controlling an orientation and position of a rotor blade swashplate according to claim 4, wherein the aircraft is a helicopter.

8. An apparatus for controlling a rotor blade swashplate to efficiently control one of a helicopter aircraft and a jet-powered tri-mode aircraft as the jet-powered tri-mode aircraft travels in a transitional mode, which is between a helicopter mode and a fixed-wing mode, the apparatus comprising:
   an aircraft-roll-rate error generator for inputting both a measured aircraft roll and a commanded aircraft roll, and outputting an aircraft roll error, which is weighted according to a predetermined schedule to decrease the outputted aircraft roll error as aircraft travelling velocity increases;
   an aircraft-pitch-rate error generator for inputting both a measured aircraft pitch and a commanded aircraft pitch, and outputting an aircraft pitch error, which is weighted according to the predetermined schedule to decrease as the aircraft travelling velocity increases;
   a first gyroscopic-moments compensator for generating roll-compensations for gyroscopic moments on the rotor blade resulting from changes in aircraft roll;
   a second gyroscopic-moments compensator for generating pitch-compensations for gyroscopic moments on the rotor blade resulting from changes in aircraft pitch;
   a signal combiner for combining the weighted aircraft roll error, the weighted aircraft pitch error, the roll-compensations, and the pitch compensations, and for outputting the combination of signals;
   a phase shifter for applying a phase shift to the combination of signals, the phase shift depending on at least one of changes in aircraft speed, changes in rotor blade velocity, and installation configurations of the rotor blade swashplate;
   a tilt signal generator for generating $\phi$ and $\theta$ tilt signals, based upon the phase-shifted combination of signals;
   a rotor blade swashplate controller for using the generated $\phi$ and $\theta$ tilt signals for controlling the rotor-blade swashplate to thereby efficiently control the aircraft.

9. The apparatus for controlling a rotor blade swashplate according to claim 8, wherein the apparatus further comprises:

a rotor blade swashplate;
at least three actuators for controlling a translation and a tilt angle of the rotor blade swashplate; and
a fly-by-wire computer system for issuing position at least three actuators for controlling a translation and a tilt angle of the rotor blade swashplate; and
a fly-by-wire computer system for issuing position commands to the at least three actuators.

10. An apparatus for altering a roll angular acceleration command and a pitch angular acceleration command, the roll angular acceleration command and the pitch angular acceleration command together requiring a maximum value of a flapping oscillation of a rotor blade to occur at a desired predetermined spatial phase angle, the desired predetermined spatial phase angle being different from an actual predetermined spatial phase angle, the apparatus comprising:
   a spatial-phase-angle corrector for using an aircraft speed, a rotor blade speed, and aircraft configuration data to compute a spatial-phase-angle difference, the spatial-phase-angle difference representing a difference between the desired predetermined spatial phase angle and the actual predetermined spatial phase angle; and
   spatial-phase-angle shifting means for applying the spatial-phase-angle difference to the desired predetermined spatial phase angle, to thereby convert the desired predetermined spatial-phase-angle into the actual predetermined spatial phase angle.

11. The apparatus for altering a roll angular acceleration command and a pitch angular acceleration command according to claim 10, wherein the apparatus further comprises:
   a rotor blade swashplate;
   at least three actuators for controlling a translation and a tilt angle of the rotor blade swashplate; and
   a fly-by-wire computer system for issuing position commands to the at least three actuators.

12. The apparatus for altering a roll angular acceleration command and a pitch angular acceleration command according to claim 11, wherein the apparatus further comprises:
   a first inputting channel for inputting first inputs, for use in determining a spatial phase angle at which flapping oscillations of the rotor blade obtain maximum values, the first inputs including:
      a measured rotor blade speed;
      a measured aircraft speed; and
      measured rotor blade swashplate positions;
   an inputting channel for inputting inputs, for use in determining gyroscopic moments on the rotor blade, the inputs including:
      measured changes in a pitch of the aircraft; and
      measured changes in a roll of the aircraft;
   a determiner for determining specific positions of the at least three actuators that will generate a desired rotor blade swashplate translation and tilt angle configuration;
   a first gyroscopic moment compensator for generating:
      an aircraft-pitch gyroscopic moment compensation to aircraft roll, the aircraft-pitch gyroscopic moment compensation to aircraft roll cancelling any longitudinal gyroscopic moments generated by a roll rate of the aircraft; and
      an aircraft-roll gyroscopic moment compensation to aircraft roll, the aircraft-roll gyroscopic moment compensation to aircraft roll cancelling any lateral gyroscopic moments generated by a roll rate of the aircraft; and
   a second gyroscopic moment compensator for generating:
      an aircraft-pitch gyroscopic moment compensation to aircraft pitch, the aircraft-pitch gyroscopic moment compensation to aircraft pitch cancelling any longitudinal gyroscopic moments generated by a pitch rate of the aircraft; and
      an aircraft-roll gyroscopic moment compensation to aircraft pitch, the aircraft-roll gyroscopic moment compensation to aircraft pitch cancelling any lateral gyroscopic moments generated by a pitch rate of the aircraft.

13. An apparatus for controlling a tip path plane of a rotating rotor blade of an aircraft having rotor blade controls, the apparatus controlling the tip path plane to eliminate axis cross-coupling from the rotor blade controls of the aircraft, the apparatus comprising:
   (a) a rotor blade swashplate;
   (b) at least three actuators for controlling a translation and a tilt angle of the rotor blade swashplate;
   (c) a fly-by-wire computer system for issuing position commands to the three actuators;
   (d) an inputting channel for inputting first inputs, for use in determining a spatial phase angle at which flapping oscillations of the rotor blade obtain maximum values, the first inputs including:
      (1) a measured rotor blade speed;
      (2) a measured aircraft speed; and
      (3) measured rotor blade swashplate positions;
   (e) a first determiner for determining a required translation and tilt angle of the rotor blade swashplate so that the maximum values of the resulting rotor blade flapping oscillations will occur in alignment with a vector sum of a desired angular acceleration of the aircraft;
   (f) a second determiner for determining specific positions of the three rotor blade swashplate actuators that will cause the rotor blade swashplate translation and tilt angle determined by the first determiner; and
   (g) a third determiner for determining a changing phase shift of the maximum values of the rotor blade flapping oscillations as the measured rotor blade speed changes, the measured aircraft speed changes, and a rotor blade lift changes.

14. The apparatus for controlling a tip path plane of a rotating rotor blade of an aircraft according to claim 13, further comprising:
   (a) a second inputting channel for inputting second inputs, for use in determining gyroscopic moments on the rotor blade, the second inputs including both measured changes in a pitch of the aircraft and measured changes in a roll of the aircraft;
   (b) a first gyroscopic moment compensator for generating:
      (1) an aircraft-pitch gyroscopic moment compensation to an aircraft roll, the aircraft-pitch gyroscopic moment compensation to aircraft roll cancelling any longitudinal gyroscopic moments generated by a roll rate of the aircraft; and
      (2) an aircraft-roll gyroscopic moment compensation to aircraft roll, the aircraft-roll gyroscopic moment compensation to aircraft roll cancelling any lateral gyroscopic moments generated by a roll rate of the aircraft; and
   (c) a second gyroscopic moment compensator for generating:
      (1) an aircraft-pitch gyroscopic moment compensation to an aircraft pitch, the aircraft-pitch gyroscopic moment compensation to aircraft pitch cancelling any longitudinal gyroscopic moments generated by a pitch rate of the aircraft; and (2) an aircraft-roll gyroscopic moment compensation to aircraft pitch, the aircraft-roll gyroscopic moment compensation to aircraft pitch cancelling any lateral gyroscopic moments generated by a pitch rate of the aircraft.

* * * * *